(No Model.)

J. HEDGES.
HAT MOLDING MACHINE.

No. 410,969. Patented Sept. 10, 1889.

Witnesses.
Inventor.
James Hedges,
by Crosby & Gregory
Attys.

UNITED STATES PATENT OFFICE.

JAMES HEDGES, OF FOXBOROUGH, MASSACHUSETTS, ASSIGNOR OF THREE-FOURTHS TO CATON BROS., BIXBY & CO., OF SAME PLACE.

HAT-MOLDING MACHINE.

SPECIFICATION forming part of Letters Patent No. 410,969, dated September 10, 1889.

Application filed April 25, 1889. Serial No. 308,623. (No model.)

*To all whom it may concern:*

Be it known that I, JAMES HEDGES, of Foxborough, county of Norfolk, State of Massachusetts, have invented an Improvement in Hat-Molding Machines, of which the following description, in connection with the accompanying drawings, is a specification, like letters on the drawings representing like parts.

In machines for forming head-coverings, as hat-bodies, or for molding hats, the movable block usually has a projection, or it may be a recess, on its upper side, which is engaged by suitable bolts or adjusting-screws carried by a cross-head. As the hats, bonnets, or other head-coverings to be molded or pressed vary materially in size and shape of crown and brim, blocks of different sizes and shapes are employed and are attached singly to the cross-head or carrier as it is desired they should be used. In practice, however, the time required to change the blocks in a large factory amounts to a great deal, and this invention has for its object to construct a clutch for the cross-head or carrier which may be quickly operated to engage and bear the blocks singly.

The invention consists in the combination, with the stationary mold and a movable mold and a cross-head or carrier, of a pair of grippers to engage a projection or other formation on the movable mold, and means, substantially as will be described, for moving the said grippers.

Figure 1:
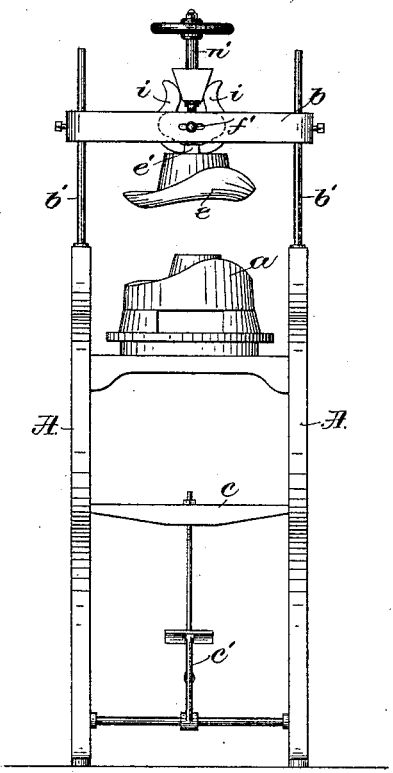
Figure 2:
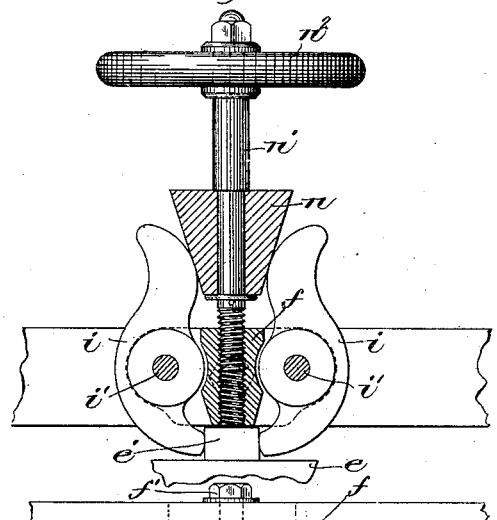
Figure 3:
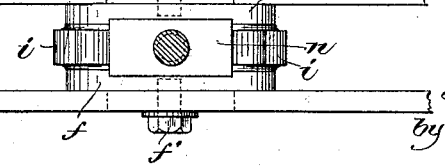

Figure 1 shows in front elevation a hat-form or molding-machine embodying this invention; Fig. 2, an enlarged detail of the clutch mechanism for the movable mold; and Fig. 3, a top view of the clutch mechanism, the hand-wheel being removed.

The main frame-work A of the machine, of suitable construction to support the operating parts, the stationary mold $a$, herein shown as the male model, the cross-head or carrier $b$, its guide-rods $b'$, moved in guideways in the frame-work, the cross-bar $c$, attached to the guides $b'$ for moving the cross-head, and treadle $c'$, by which it is moved, and the movable mold $e$, having the projection $e'$ upon its upper side and herein shown as the female mold, are all of usual construction. The cross-head $b$ is composed of two parallel bars secured together at their ends. A block or frame $f$ (see Fig. 3) is held in position between the side bars of the cross-head $b$ by screws or bolts $f'$, which pass through slots in the bars, which slots permit of longitudinal adjustment of the block or frame $f$. Two grippers or jaws $i$ are pivoted in the block or frame $f$ by pins $i'$, the upper ends of the said grippers or jaws being turned outwardly from each other, as best shown in Fig. 2, to receive between them a rectangular wedge-block $n$, mounted loosely on the shaft $n'$. The wedge-block $n$ bears against a shoulder formed on the shaft $n'$. The shaft $n'$ is screw-threaded at its lower end and enters a screw-threaded socket or recess formed in the block $f$, and at the upper end of said shaft $n'$ a hand-wheel $n^2$ is attached; yet said hand-wheel may be omitted and the shaft turned in any usual or suitable way. The lower ends of the grippers or jaws $i$ are formed to engage with a projection $e'$ on the block $e$.

In operation, by revolving the hand-wheel $n^2$ in one direction, the wedge-block $n$ is forced down between the upper end of the grippers or jaws to tightly engage the projection $e'$, and to release the block to substitute a new one or one of different form, the hand-wheel will be turned in the opposite direction. By the clutch herein shown and described the block $e$ may be removed and a new one substituted readily, so that but little time is required.

I do not desire to limit my invention to the precise construction of clutch herein shown, as it may be modified and yet retain the spirit of this invention, nor to the particular formation on the mold for the engagement therewith of the grippers.

I claim—

In a machine for molding head-coverings, a stationary mold, a reciprocating cross-head, and a movable mold detachably connected to said cross-head by means of the grippers $i$, pivoted in said cross-head, the wedge-block $n$, interposed between the grippers, and the rod $n'$, screw-tapped in a nut in the cross-head and carrying the wedge-block and adapted to be rotated to adjust the wedge-block vertically between the grippers to engage and release the movable block, substantially as described.

In testimony whereof I have signed my name to this specification in the presence of two subscribing witnesses.

JAMES HEDGES.

Witnesses:
   ALFRED MULLINGS,
   JAMES HEDGES, Jr.